United States Patent [19]

McCord

[11] Patent Number: 4,971,864
[45] Date of Patent: Nov. 20, 1990

[54] LAMINAR ARTICLES MADE FROM MIXTURES OF A POLYOLEFIN AND ETHYLENE/VINYL ALCOHOL COPOLYMERS

[75] Inventor: Elizabeth F. McCord, Yorklyn, Del.

[73] Assignee: E. I. du Pont de Nemours and Company, Wilmington, Del.

[21] Appl. No.: 351,921

[22] Filed: May 15, 1989

[51] Int. Cl.$^5$ .............................................. B32B 21/08
[52] U.S. Cl. .................................. 428/516; 428/36.7; 428/520
[58] Field of Search ........................ 428/36.7, 520, 516

[56] References Cited

U.S. PATENT DOCUMENTS

| | | | |
|---|---|---|---|
| 3,975,463 | 8/1976 | Hirata et al. | 260/897 B |
| 4,026,967 | 5/1977 | Flexman et al. | 260/878 R |
| 4,410,482 | 10/1983 | Subramanian | 264/515 |
| 4,416,942 | 5/1982 | DiLuccio | 428/332 |
| 4,444,817 | 4/1984 | Subrämania | 428/36 |
| 4,612,155 | 9/1986 | Wong et al. | 264/176 R |

FOREIGN PATENT DOCUMENTS

| | | |
|---|---|---|
| 15556 | 9/1980 | European Pat. Off. . |
| 218245 | 4/1987 | European Pat. Off. . |
| 62-135363 | 6/1987 | Japan . |

*Primary Examiner*—Edith Buffalow

[57] ABSTRACT

A laminar article is provided, comprising a combination of a polyolefin, an ethylene-vinyl alcohol copolymer having a melting point at least about 5° C. higher than the polyolefin, and a compatibilizer of a compatible polyolefin backbone grafted with cyclic anhydride moieties, wherein the ethylene-vinyl alcohol copolymer is present within the polyolefin as multiple, thin, substantially parallel, overlapping layers.

16 Claims, No Drawings

LAMINAR ARTICLES MADE FROM MIXTURES OF A POLYOLEFIN AND ETHYLENE/VINYL ALCOHOL COPOLYMERS

BACKGROUND OF THE INVENTION

This invention relates to laminar blends of polyolefins and ethylene-vinyl alcohol copolymers which have superior barrier and physical properties.

Containers and films which are blends or laminates of polyolefins and ethylene-vinyl alcohol copolymers have been the subject of several investigations because this combination of polymers has the potential for providing high resistance to permeation by water, oxygen, and hydrocarbons.

U.S. Pat. No. 3,975,463 discloses a resinous composition of (a) 30 to 98 % by weight of a crystalline polyolefin, (b) 2 to 70 % by weight of a saponified product of an ethylene vinyl acetate copolymer, and (c) 0.5 to 15 parts by weight of a thermoplastic polymer containing a carbonyl group in the main or side chain, and a molded structure formed therefrom, which has a specific multilayer structure and a high gas permeation resistance. The thermoplastic polymer (c) can be a copolymer of maleic anhydride or an acrylic acid grafted polyethylene.

European Patent Application 15556 discloses a process for manufacturing laminar articles by forming heterogeneous melts of a combination of a polyolefin and a second polymer with an alkylcarboxyl substituted polyolefin as a compatibilizing material, and the laminar articles so formed. The second polymer can be poly-(ethylene-co-vinyl alcohol), and the compatibilizing material can be obtained by melt-grafting fumaric acid onto polyethylene. In particular, a grafted material is disclosed which was grafted with about 0.9 weight percent fumaric acid; the ratio of polyolefin:second polymer:compatibilizer can be 65:30:5.

A study of barrier materials prepared following the teachings of U.S. Pat. No. 3,975,463 and European Patent Application 15556 revealed that the laminar structures of European Patent Application 15556 are capable of providing better barriers than the composites of U.S. Pat. No. 3,975,463. However, the laminar structures prepared following the teaching of European Patent Application No. 15556 (particularly Examples 12 and 13) were found to exhibit significant variation in resistance to permeation by hydrocarbons and oxygen and in mechanical strength. Such variations are undesirable in laminar structures which are to be used in demanding applications such as containers for hydrocarbon fuels and packaging for perishable foodstuffs. Thus a need exists to provide polyolefin/ethylene vinyl alcohol copolymer laminar structures which will consistently provide optimum barrier properties and mechanical strength.

SUMMARY OF THE INVENTION

Laminar articles prepared from the following ingredients in the amounts specified consistently exhibit outstanding barrier properties toward water, oxygen and hydrocarbon solvents and have good mechanical properties.

Specifically, the present invention provides a laminar article consisting essentially of a laminar article consisting essentially of a combination of
  (a) a polyolefin;
  (b) an ethylene-vinyl alcohol copolymer containing about 20-60% by weight of ethylene units, said copolymer having a melting point at least about 5° C. higher than said polyolefin; and,
  (c) a compatibilizer comprising a polyolefin backbone having grafted thereon cyclic anhydride moieties in an amount such that the carbonyl content of the compatibilizer is about 0.3-4.0% by weight, said polyolefin backbone prior to grafting being miscible with said polyolefin (a);
    wherein the ethylene-vinyl alcohol copolymer is present within the polyolefin as multiple, thin, substantially parallel, overlapping layers;
    the quantity of polyolefin (a) being 0 to about 97.9% by weight, the quantity of ethylene-vinyl alcohol copolymer (b) being about 2-20% by weight, both based on the total weight of (a), (b), and (c), and the quantity of compatibilizer (c) being such that the ratio of the weight of carbonyl groups in the compatibilizer to the weight of ethylene-vinyl alcohol copolymer (b) is about 0.0014:1.0 to about 0.006:1.0.

The present invention further provides a process for manufacturing a laminar, shaped article of polymeric material comprising the steps of:
  (a) establishing a melted, heterogeneous blend of polyolefin, an ethylene-vinyl alcohol copolymer containing about 20-60% by weight of ethylene units and having a melting point at least about 5.C higher than the polyolefin, and a compatibilizer comprising a polyolefin backbone having grafted thereon cyclic anhydride moieties, in an amount such that the carbonyl content of the compatibilizer is about 0.3-4.0% by weight, said polyolefin backbone prior to grafting being miscible with said polyolefin;
  (b) extending a body of the melt; and
  (c) cooling the extended body to below the melting point of the polyolefin.

DETAILED DESCRIPTION OF THE INVENTION

The polyolefin (a) used in preparing the laminar articles of this invention includes polyethylene, polypropylene, polybutylene, and related copolymers. Polyethylene is preferred and may be high, medium, or low density material.

Component (b) is an ethylene-vinyl alcohol copolymer containing about 20 to about 60% by weight of ethylene, which copolymer is further characterized by having a melting point at least about 5° C. greater than polyolefin (a). More preferably, the ethylene-vinyl alcohol copolymer will have a melting point at least about 10° C. greater than polyolefin (a). For higher melting polyolefins, the requirement that the copolymer be higher melting than the polyolefin limits the amount of ethylene which may be present in the ethylene-vinyl alcohol copolymer to less than 60% by weight. For example, when using polypropylene having a melting point of about 168° C., ethylene-vinyl alcohol containing greater than about 35% by weight of ethylene will not be useful because such copolymers have melting points which are around or below 168 ° C. As is well known to those skilled in the art, the required ethylene-vinyl alcohol copolymers are prepared by saponification of ethylene-vinyl acetate copolymers. For use in the present invention, the degree of saponification should be greater than about 95% and preferably at least 99%. Typically these copolymers have number average molecular weights of about 20,000 to 80,000, but their molecular weight is not directly critical to this invention. As will be described in detail hereinafter, it is preferred that the melt viscosity of the ethylene-vinyl alcohol copolymer be 1.1 to 3.5 times greater than the melt viscosity of the polyolefin at the temperature at which the laminar articles are formed. Therefore, only to the extent that molecular weight is related to melt viscosity is the molecular weight of the ethylene-vinyl alcohol copolymer significant.

Component (c), the compatibilizer, is a graft polymer with a polyolefin backbone onto which cyclic anhydride moieties, derived from maleic anhydride, for example, have been grafted. The compatibilizer serves to adhere adjacent layers of polyolefin and ethylene-vinyl alcohol copolymer to one another. It is important in preparing the laminar articles of this invention that the olefin polymer serving as the backbone of the graft polymer be miscible, prior to grafting, with polyolefin (a). In effect, this restriction essentially requires that the compatibilizer be prepared from a polyethylene backbone when component (a) is polyethylene or from a polypropylene backbone when component (a) is polypropylene. However, it is recognized that random copolymers containing only very small amounts of olefin comonomer are probably miscible with homopolymers based on the major component of such random copolymers. For instance, it is believed that random ethylene/propylene copolymers containing up to about 8 mole % ethylene are miscible with polypropylene homopolymer. As will be shown hereinafter in the examples, a variety of polymers having either grafted or copolymerized cyclic anhydride moieties have been tested as compatibilizers. Even such closely related polymer backbones as ethylene-propylene-hexadiene terpolymers having maleic anhydride moieties grafted thereon are less effective when polyolefin (a) is polyethylene or polypropylene than are compatibilizers based on polymer backbones which correspond to polyolefin (a). The compatibilizer is further characterized in that it contains grafted cyclic anhydride moieties in an amount such that carbonyl content of the compatibilizer is about 0.3–4.0% by weight. Such grafts can be prepared with anhydride contents ranging from essentially 0 to about 8% anhydride, expressed as weight percent maleic anhydride. A polymer containing 8% anhydride contains about 163 meq CO per 100 g polymer. A useful range of anhydride content, however, is about 0.5 to about 5.5% anhydride, expressed as weight percent maleic anhydride, or a carbonyl content of about 0.3 to about 4%. For example, maleic anhydride has a formula weight of 98.06 and contains 2 C=O groups, formula weight 28.01. Thus a compatibilizer containing 1 weight % anhydride has a carbonyl content of 0.57%. The carbonyl content of the compatibilizer can be readily determined by measuring the intensity of the anhydride carbonyl peak in the infra-red spectrum of the compatibilizer and comparing the magnitude of this peak with the magnitude of the same peak in the spectra of polymers containing known amounts of the grafted anhydride.

The required compatibilizers can be prepared by procedures such as those described in U.S. Pat. Nos. 4,026,967 and 4,612,155, the disclosures of which are incorporated herein by reference. While numerous compounds can be used as graft monomers, maleic anhydride is preferred. Less preferred graft monomers include mono-esters of maleic acid, maleic acid and fumaric acid, which monomers are believed to be largely converted to cyclic anhydride moieties at the high temperatures encountered during the grafting reaction. Also suitable are other cyclic anhydrides containing carbon-carbon unsaturation such as dodecenyl succinic anhydride, 5-norbornene-2,3-anhydride, and 3,6-endomethylene-1,2,3,6-tetrahydrophthalic anhydride.

In preparing the laminar articles of this invention, the ethylene-vinyl alcohol copolymer, which provides the discontinuous phase, is used in amounts of about 2–20% by weight, preferably about 4–15% by weight, based on the total weight of components (a), (b) and (c). Articles containing less than about 2% by weight of copolymer generally do not exhibit sufficient improvement in barrier properties toward oxygen or hydrocarbons to be useful commercially. Articles containing greater than about 20% by weight of ethylene-vinyl alcohol copolymer exhibit variations in mechanical strength of such magnitude that the articles are unreliable for many applications.

The amount of compatibilizer required to prepare the laminar articles of this invention is a function of (i) the concentration of ethylene-vinyl alcohol copolymer in the article and (ii) the concentration of grafted cyclic anhydride moieties in the compatibilizer expressed in terms of the carbonyl content. As previously indicated, the compatibilizer should be used in amounts such that the weight ratio of carbonyl groups in the compatibilizer to the amount of ethylene-vinyl alcohol copolymer used is about 0:0014:1.0 to about 0.006:1.0. For example, if one were preparing a laminar article containing 10% by weight ethylene-vinyl alcohol copolymer and using as a compatibilizer polyethylene having grafted thereon about 1% by weight of maleic anhydride moieties (corresponding to a carbonyl content of 0.57% by weight), then one could use from 2.6–10.5% by weight of compatibilizer. Weight ratios of about 0.002:1.0 to about 0.004:1.0 are preferred. In the hypothetical example just presented, these preferred ratios would correspond to 3.5% to 7.0% by weight.

The amount of polyolefin component(a) used in the articles of this invention is clearly 100% by weight less the sum of the percentages of components (b) and (c) (not counting any additional minor amounts of conventional additives, fillers, etc., which may be used). It is preferable that the concentration of polyolefin not be less than 60% by weight and more preferable that it not be less than 70% by weight based on the total weight of the three components.

The articles of the present invention are prepared substantially by the process described in U.S. Pat. 4,410,482, which is incorporated herein by reference. The laminated articles are preferably made by mixing together particles of the polyolefin, particles of the ethylene-vinyl alcohol copolymer and particles of the compatibilizer, heating the mixture to yield a heterogeneous melt of material and forming the melt in a way which results in extending the melt to yield multiple elongated discontinuous polymer domains consisting of the ethylene-vinyl alcohol copolymer within a continuous domain of polyolefin. As used herein, the term "extending the melt" means that a given volume of melt is shaped by means which significantly increase its surface area, such as the extension which would occur when the melt is squeezed by rollers, pressed between platens, extended between die lips or inflated during blow molding.

In one embodiment, the polymer particles, (components (a), (b), and (c)) in unmelted form are mixed thoroughly so as to provide a statistically homogenous distribution. The dry mix is then fed to a single screw extruder, for example, where upon heating, the polyolefin and compatibilizer melt first. After the higher melting ethylene-vinyl alcohol copolymer subsequently melts, care must be exercised to avoid substantial additional mixing. The blend can also be established by combining molten polyolefin with solid particles of ethylene-vinyl alcohol copolymer and compatibilizer and then heating the combination. The success of the invention depends on establishing a melted heterogeneous blend of polymers which, when extended, e.g. by extrusion, yields an article in which one polymer is in the form of a continuous matrix phase and the other polymer is in the form of a discontinuous distributed phase. The polymer comprising the discontinuous phase is present as a multitude of thin, parallel and overlapping layers embedded in the continuous phase.

Although it is not required, it is preferred that both the polyolefin and the ethylene-vinyl alcohol copolymer should be mixed as particles. The particles should, as a general rule, be of a size such that the molten blend of incompatible polymers, when introduced to some melt extension means, such as extrusion die lips, exhibits the heterogeneity necessary for practice of the invention. When the particles, especially particles of the copolymer, are of too small a size, the melted blend, even though not excessively mixed, tends to function as a homogeneous composition because the domains of material making up the discontinuous polymer phase are so small. When the particles, especially particles of the copolymer, are of too large a size, the melt blend tends to form into shaped articles having a marbleized structure rather than a laminar structure, the large domains of the materials which would make up the discontinuous phase extending to opposite boundaries of the shaped articles and causing disruption of the polyolefin which would make up the continuous phase. Particles about 1-7 mm, preferably about 2-4 mm on a side, are found to be particularly well suited. The particles are preferably generally regular in shape, such as cubical or cylindrical or the like. The particles may, however, be irregular; and they may have one or two dimensions substantially greater than other dimension such as would be the case, for example, when flakes of material are used.

When each of the incompatible polymers is present as individual particles, the particles are preferably of approximately the same size, although this is not required. The compatibilizer can be provided by itself as individual particles, or it can be mixed into, coated onto, or otherwise combined with the polyolefin. It is preferred not to melt blend the compatibilizer directly with the ethylene-vinyl alcohol copolymer prior to making the laminar articles, because the compatibilizer appears to cause gellation or crosslinking of the ethylene-vinyl alcohol copolymer when so blended. In order to insure that the compatibilizer is well distributed in the final blend, it is sometimes desirable to supply the compatibilizer in a powdered, rather than a pelletized form.

The thickness of the layers of material in the discontinuous phase is a function of the particle size combined with the degree of extension in the forming step. The particle size of the melt blend which will be the discontinuous phase is generally selected with a view toward obtaining, after extension, overlapping layers which can be from about 0.1 to 60 micrometers thick or perhaps slightly thicker.

Dry mixing particles of the polymers can be accomplished by any well-known means such as by means of a V-blender or a tumble mixer or, on a larger scale, by means of a double-cone blender. Continuous mixing of the particles can be accomplished by any of several well-known methods. Of course, the particles can also be mixed by hand, the only requirement of the mixing being that any two statistical samplings of the mixture in a given mass of material should yield substantially the same composition. The mixing of the incompatible polymers can also be accomplished by adding particles of the higher melting copolymer to a melt of the lower melting polyolefin maintained at a temperature below the higher melting point. In that case, the melt is agitated to obtain an adequate mixture; and the mixture is, thus, ready for the final heating step.

Once mixed, the incompatible polymers are ultimately heated to a temperature greater than the melting of the higher melting ethylene-vinyl alcohol copolymer. The heating yields a molten heterogeneous blend of materials which is ready for the stretching step of the process. The heating must be conducted in a manner which avoids substantial additional mixing of the incompatible polymers because such mixing could cause homogenization and could result in a melt and a shaped article of substantially uniform, unlayered structure. The heating can be conducted by any of several well-known means and is usually conducted in an extruder. It has been found that a single-screw extruder of the type which is designed for material transport rather than material mixing can be used for the heating step and for transporting material to the forming steps of this process without causing homogenization of the molten two phase polymer composition. Low shear and low mixing extruders of the kind normally used for polyvinyl chloride, acrylonitrile, or polyvinylidene chloride can be used to prepare the articles of this invention if they are used in a way to melt and transport the materials while minimizing mixing of the components. High shear and high mixing extruders of the kind normally used for nylon and polyethylene should generally not be used.

The forming step requires extension of the molten blend followed by cooling. Melt extension can be accomplished by any of several means. For example, the melt can be extended by being squeezed between rollers, pressed between platens, or extruded between die lips. Molding processes such as blow molding also cause extension in accordance with this process. In the manufacture of shaped articles such as containers, the extension can be accomplished by a combination of extruding a blend of the heterogeneous melt to yield a container preform or parison followed by blow molding the parison into a finished container.

The extension or melt forming can be in a single direction or in perpendicular directions. Whether the forming is conducted in one direction or two, there should be an elongation of from about 10 to 500 or even 1000 percent or more in at least one direction; an elongation of about 100 to about 300 percent is preferred. Avoidance of excessive extension is important only insofar as excessive elongation of the melt may lead to weakening or rupture of the article.

Melt extension or forming is followed by cooling to below the temperature of the melting point of the polyolefin to solidify the shaped article. The cooling can be conducted by any desired means and at any convenient rate. In the case of extension by blow molding, the mold is often chilled to cool the article; and, in the case of extruding a film, cooling can be accomplished by exposure to cool air or by contact with a quenching roll.

In the actual step in which extension of the melt occurs so as to form the laminar articles of this invention, the temperature of the melt is preferably 5°-25° C. greater than the melting point of the higher melting ethylene-vinyl alcohol copolymer. Higher temperatures lower the melt viscosities of the incompatible polymers which in turn may facilitate homogenization which is to be avoided.

It has been found that laminar articles prepared by extension of the molten polymer blends used in this invention generally have better properties if the melt viscosity of the ethylene-vinyl alcohol copolymer is somewhat greater than the melt viscosity of the polyolefin, both viscosities being measured at about the temperature at which forming occurs. Preferably, the melt viscosity of the ethylene-vinyl alcohol copolymer should be from 1.1 to 3.5 times greater than the melt viscosity of the polyolefin.

EXAMPLE 1

A series of eight dry blends are prepared from particles of polyethylene, ethylene-vinyl alcohol copolymer and a compatibilizer by mixing in a polyethylene bag. The blends differ in that the weight ratio of compatibilizer to ethylene-vinyl alcohol copolymer (EVOH) is varied. The proportions of the ingredients in the blends are shown in Table 1-A.

TABLE 1-A

| Blend | EVOH % by wt. | Compatibilizer % by wt. | Polyethylene % by wt. |
|---|---|---|---|
| 1-1 | 10 | 10.0 | 80.0 |
| 1-2 | 10 | 5.0 | 85.0 |
| 1-3 | 10 | 3.3 | 86.7 |
| 1-4 | 10 | 2.5 | 87.5 |
| 1-5 (Comparative) | 10 | 2.0 | 88.0 |
| 1-6 (Comparative) | 10 | 1.67 | 88.33 |
| 1-7 (Comparative) | 10 | 1.0 | 89.0 |
| 1-8 (Comparative) | 10 | 0.5 | 89.5 |

The EVOH used contains 30% by weight ethylene and has a melt index of 3g/10 min (ASTM D-1238 Condition V) a melting point of 184° C. and a melt viscosity at 195° C. of 3022 Pa.sec at a shear rate of 30 sec$^{-1}$.

The polyethylene used has a density of 0.955 g/cc, a melt index of 0.35 g/10 min (determined by ASTM-1238, condition E), a melting point of 134° C. and a melt viscosity at 195° C. of 2448 Pa.sec at a shear rate of 30 sec$^{-1}$.

The compatibilizer is obtained by melt grafting maleic anhydride onto the polyethylene described above in accordance with the teaching of U.S. Pat. No. 4,612,155. The quantity of maleic anhydride grafted onto the polyethylene is about 1.0% by weight based on the total weight of the grafted polymer. This concentration of maleic anhydride corresponds to a carbonyl content of about 0.57% by weight.

Laminar bottles having a capacity of about 1 L (about 1 quart) are blow molded from each of the eight blends by feeding the dry blends to a Rocheleau Model 7A continuous extrusion blow molding machine equipped with a 2:1 compression ratio screw (diam. 38.1 mm). The bottles are blow molded at an extrusion temperature of about 195°-200° C. All of the bottles produced exhibit a laminar distribution of the EVOH. The bottles weigh about 62 g and have walls about 1 mm thick.

Bottles prepared from each of the blends are evaluated for (i) mechanical strength, by dropping bottles filled with water from increasing heights until failure, and for (ii) barrier properties, by measuring the loss of weight from bottles filled with xylene.

The bottle drop tests are run by filling a set of three bottles prepared from each of the blends with water, capping and allowing them to stand at 25° C. for six days. The bottles are dropped onto smooth concrete from increasing heights using 0.305 m (one foot) increments until the bottles fail. Ambient temperature during the testing is 17° C. The average of the greatest heights passed by the three bottles in each set is shown in Table 1-B.

The effectiveness of the barrier is determined by filling a set of three bottles prepared from each of the blends with xylene, capping and determining the weight loss at 60° C. over a 16 day period. The bottles are weighed periodically and their weight losses are plotted against time so that an average steady state weight loss can be determined for each bottle. Based on the weight of the container and its geometry, the surface area and average wall thickness are calculated (ASTM - 2684). Permeability values (P) are then calculated. The average of the values obtained for each set of bottles is also shown in Table 1-B.

The ratio of the weight of carbonyl groups furnished by the compatibilizer to the weight of EVOH is also given for each of the blends in Table 1-B.

TABLE 1-B

| Blend | Ratio CO/EVOH[1] | Drop Test m (ft) | Permeability g.mm/day.m$^2$ |
|---|---|---|---|
| 1-1 | 0.0057 | 3.4 (11) | 3.8 |
| 1-2 | .0029 | 2.1 (7) | 6.0 |
| 1-3 | .0019 | 2.1 (7) | 5.7 |
| 1-4 | .0014 | 2.1 (7) | 5.4 |
| 1-5 (Comparative) | .0011 | 1.8 (6) | 6.9 |
| 1-6 (Comparative) | .0010 | 0.9 (3) | 7.0 |
| 1-7 (Comparative) | .0006 | 1.8 (6) | 12.8 |
| 1-8 (Comparative) | .0003 | 0.9 (3) | 14.3 |

[1]defined in specification

Bottles prepared from blends 1-1 to 1-4 which are within the scope of this invention exhibit good mechanical strength as evidenced by the drop test results and a low permeability to xylene at 60 ° C. Bottles prepared from comparative blends 1-5 to 1-8 are beyond the scope of this invention and exhibit lower mechanical strength with greater variations and increasing degrees of permeation.

Example 12 of European Patent Application No. 15556 describes a laminar film prepared from a blend of 30 parts EVOH, 5 parts of a compatibilizer derived by grafting 0.9% by weight of fumaric acid onto polyethylene and 65 parts of polyethylene. The weight ratio of carbonyl content to EVOH in Example 12 of the European Patent Application is 0.00072. This value falls between the ratios for comparative blends 1-6 and 1-7. These blends yield bottles which are inferior to those prepared from compositions within the scope of the invention.

It is recognized that Example 12 of the European Patent Application uses EVOH at a 30% by weight level while the blends in this Example contain 10% by weight of EVOH. In order to make a more direct comparison with the composition of Example 12 of European Patent Application 15556, two compositions are prepared from the same ingredients used hereinbefore in this Example but in the amounts shown in Table 1-C.

TABLE 1-C

| Blend | EVOH % by wt. | Compatibilizer % by wt. | Polyethylene % by wt. |
|---|---|---|---|
| 1-9 (Comp) | 30 | 5 | 65 |
| 1-10 (Comp) | 30 | 3 | 67 |

Bottles are prepared as before and tested by dropping and toward permeation to xylene. The results as well as the weight ratio of carbonyl to EVOH are given in Table 1-D.

TABLE 1-D

| Blend | Ratio CO/EVOH | Drop Test m (ft) | Permeability g.mm/day.m$^2$ |
|---|---|---|---|
| 1-9 (Comp) | 0.0010 | 0.9 (3) | 0.34 |
| 1-10 (Comp) | 0.0006 | 0.6 (2) | 2.55 |

The ratios for these Comparative tests bracket the carbonyl/EVOH ratio of 0.00072 for Example 12 of the European Patent Application. Clearly the bottles prepared from comparative blends 1-9 and 1-10 are inferior in mechanical strength compared with the bottles prepared from blends within the scope of this invention. The permeability values are lower for these comparisons because the amount of EVOH is triple that used in runs 1-1 to 1-4; however, the permeability does show a large variation.

EXAMPLE 2

A number of compatibilizers are tested for their ability to adhere EVOH to polyethylene or polypropylene in laminar films. Each of the compatibilizers contains either grafted or copolymerized maleic anhydride moieties. The compatibilizers are as follows:

A. 1% by weight maleic anhydride grafted to polyethylene.

B. 2% by weight maleic anhydride grafted to an ethylene/propylene/diene rubber containing about 4% by weight of units derived from 1,4-hexadiene.

C. 1.5% by weight maleic anhydride grafted to an ethylene-vinyl acetate copolymer containing 9% by weight vinyl acetate.

D. 1.06% by weight maleic anhydride grafted to an ethylene-vinyl acetate copolymer containing 28% by weight vinyl acetate.

E. 5.5% by weight of copolymerized maleic anhydride in a maleic anhydride/styrene copolymer.

F. 10% by weight of copolymerized maleic anhydride in a maleic anhydride/styrene copolymer.

G. 3.6% by weight of maleic anhydride grafted to polypropylene.

The dry blends shown in Table 2-A are prepared from the above compatibilizers and the polyethylene and EVOH copolymer used in Example 1.

TABLE 2-A

| Blend | EVOH g | Polyethylene g | Compatibilizer Type | Compatibilizer g |
|---|---|---|---|---|
| 1-1 | 0 | 2000 | — | 0 |
| 2-2 | 200 | 1700 | A | 100 |
| 2-3 | 200 | 1750 | B | 50 |
| 2-4 | 200 | 1737.4 | C | 66.6 |
| 2-5 | 200 | 1700 | D | 100 |
| 2-6 | 200 | 1780 | E | 20 |
| 2-7 | 200 | 1790 | F | 10 |
| 2-8 | 200 | 1772 | G | 28 |

Laminar films 0.5 mm (20 mils) thick are prepared from each of the blends using a Wayne "Yellow Jacket" 25.4 mm (1 inch) extruder with a standard screw feeding a Wayne 152 mm (6 inch) sheet die at a die temperature of 190° C. The laminar films are tested for adhesion of the EVOH layers with the polyethylene by flexing samples of film 180° (the films are actually creased as one would fold a piece of paper) in different directions (machine direction, transverse direction and diagonally) and checking for delamination. The films are rated from 1 to 5 according to their resistance to delamination, with 5 being excellent and showing no signs of delamination down to 1 being poor and showing essentially no resistance to delamination. The results of these flexing tests are presented in Table 2-B. The weight ratio of carbonyl content furnished by the compatibilizer to EVOH is also given in Table 2-B for each of the blends.

TABLE 2-B

| Blend | Compatibilizer | Ratio CO/EVOH | Resistance to Delamination |
|---|---|---|---|
| 1-1 | — | — | 5 |
| 2-2 | A | 0.0029 | 5 |
| 2-3 | B | 0.0029 | 1 |
| 2-4 | C | 0.0028 | 3 |
| 2-5 | D | 0.0030 | 3 |
| 2-6 | E | 0.0031 | 1 |
| 2-7 | F | 0.0029 | 2 |
| 2-8 | G | 0.0029 | 3–4 |

Blend No. 1 is pure polyethylene which was run as a control. Blend No. 2 which is within the scope of this invention in that it employs a compatibilizer based on polyethylene which corresponds to the matrix polymer yields films which do not exhibit any sign of delamination. All of the other blends yield films which show obvious delamination. This is surprising particularly for films derived from Blend Nos. 3 and 8 which use compatibilizers based on polyolefin backbones which while not soluble in the polyethylene matrix polymer are similar in many respects to the matrix polymer.

A second series of blends is prepared in which polypropylene serves as the matrix resin. The polypropylene used has a melt index of 3–4 g/10 min. (determined by ASTM - 1238, condition L), a melting point of 168° C. and a melt viscosity at 195° C. of 1458 Pa.sec at a shear rate of 30 sec−1. The EVOH copolymer is the same as that used in Example 1. The compatibilizers are those previously described in this example. The compositions of these blends is given in Table 2-C.

TABLE 2-C

| Blend | EVOH, g | Polypropylene, g | Compatibilizer Type | Compatibilizer g |
|---|---|---|---|---|
| 2-9 | 0 | 2000 | — | 0 |
| 2-10 | 200 | 1770 | G | 30 |
| 2-11 | 200 | 1728 | C | 72 |
| 2-12 | 200 | 1746 | B | 54 |
| 2-13 | 200 | 1780.4 | E | 19.6 |

TABLE 2-C-continued

| Blend | EVOH, g | Polypropylene, g | Compatibilizer Type | g |
|---|---|---|---|---|
| 2-14 | 200 | 1789.2 | F | 10.8 |
| 2-15 | 200 | 1692 | A | 108 |

Laminated films 0.5 mm (20 mils) thick are prepared from the blends using the Wayne extruder previously described but with a die temperature of 195° C. The films are rated as described before by creasing. The results are presented in Table 2-D.

TABLE 2-D

| Blend | Compatibilizer | Ratio CO/EVOH | Resistance to Delamination |
|---|---|---|---|
| 2-9 | — | — | 5 |
| 2-10 | G | 0.0031 | 4.5–5 |
| 2-11 | C | 0.0031 | 1 |
| 2-12 | D | 0 0031 | 1 |
| 2-13 | B | 0.0031 | 1 |
| 2-14 | E | 0.0031 | 1 |
| 2-15 | F | 0.0031 | 1 |
| 2-16 | A | 0.0031 | 2 |

Blend No. 2-9 is pure polypropylene which is run as a control. Only Blend No. 10 which employs a compatibilizer based on polypropylene which matches the matrix polymer exhibits acceptable adhesion. The rating of 4.5–5.0 for Blend No. 10 indicates that some of the flex tests showed no sign of delamination while other tests showed only slight signs of delamination such as some hazing of the polymer film where it was creased. Surprisingly, compatibilizers A and B which are maleic anhydride grafts to polyolefin backbones other than polypropylene provide little adhesion.

EXAMPLE 3

This example illustrates the effect of compatibilizer concentration on the adhesion observed for laminar blow molded bottles prepared from EVOH and polypropylene. The compatibilizer used is compatibilizer G of Example 2, supplied in the form of a granulate with particle size about 0.86 mm (about 20 mesh). The EVOH copolymer used is described in Example 1. Three different commercial samples of polypropylene are used and are described as follows:

A. A polypropylene homopolymer having a melt index of 4 g/10 min. sold by Shell as 5A44.

B. A polypropylene homopolymer having a melt index of about 3g/10 min. sold by Himont as PD-064.

C. A polypropylene homopolymer having a melt index of 2.2 g/10 min. sold by Shell as 5384.

Two different blow molding machines are used in making the bottles described hereinafter. One is the Rocheleau Model 7A continuous extrusion blow molding machine, hereinafter R, described in Example 1. This machine is used to prepare 1 liter bottles and is operated at a screw speed of 80 rpm. The other machine is a Hayssen continuous blow molding machine, hereinafter H, which is used to make 1 liter bottles and is operated at a screw speed of 50 rpm.

Table 3-A describes a number of bottles prepared under the conditions indicated from dry blends containing 10% by weight EVOH, amounts of compatibilizer as shown in the Table, with the balance being polypropylene as indicated.

The adhesion results are reported on a scale of 5 (excellent) to 1 (poor). The adhesion is judged by observing the extent of delamination resulting from (A) squeezing a bottle on opposite sides of the vertical midpoints of its cylindrical body until the interior surfaces of the cylindrical walls meet and (B) indenting the shoulder of a bottle with one's thumb, the shoulder being that portion of a bottle where its cylindrical body joins its conical portion connecting its cylindrical body to its neck. (The stresses resulting from indenting the shoulder are much greater than those induced by squeezing the body of the bottle.) Bottles which exhibit no signs of delamination at the shoulder or in the middle are rated 5. Bottles showing some delamination at the shoulder, but none in the middle, rate 4. Bottles showing traces of delamination in the middle, rate 3. Bottles showing some spreading of delamination from where they are squeezed in the middle, rate 2. For bottles in which the delamination spreads from top to bottom upon squeezing, the rating is 1.

TABLE 3A

| Bottle No. | Compat. wt. % | Polyprop. Type | Molding Machine | Extrudate Temp., °C. | CO/EVOH Ratio | Adhesion Rating |
|---|---|---|---|---|---|---|
| 3-1 | 5.0 | A | R | 196 | 0.0103 | 5.0 |
| 3-2 | 1.0 | A | R | 196 | 0.00206 | 4.5 |
| 3-3 | 0.5 | A | R | 193 | 0.00103 | 4.8 |
| 3-4 | 1.0 | B | R | 200 | 0.00206 | 4.0 |
| 3-5 | 0.5 | B | R | 197 | 0 00103 | 3.9 |
| 3-6 | 1.0 | A | R | 205 | 0 00206 | 5.0 |
| 3-7 | 1.0 | C | R | 205 | 0 00206 | 4.5 |
| 3-8 | 0.5 | C | R | 203 | 0.00103 | 4.0 |
| 3-9 | 0.5 | C | R | 207 | 0 00103 | 4.0 |
| 3-10 | 0.5 | C | R | 210 | 0.00103 | 3.5 |
| 3-11 | 0.5 | C | R | 213 | 0.00103 | 3.5 |
| 3-12 | 1.0 | C | H | 202 | 0.00206 | 5.0 |
| 3-13 | 1.0 | C | H | 206 | 0.00206 | 4.5 |
| 3-14 | 1.0 | C | H | 210 | 0.00206 | 4.5 |
| 3-15 | 0.75 | C | H | 203 | 0.00155 | 2.5 |
| 3-16 | 0.5 | C | H | 204 | 0.00103 | 1.5 |

Bottle numbers 3, 5, 8, 9, 10, 11 and 16 are all prepared with 0.5 wt % compatibilizer, which corresponds to CO/EVOH ratio of 0.00103, below the lower limit of 0.0014. The adhesion ratings for these seven bottles average 3.6. Bottle numbers 2, 4, 6, 7, 12, 13 and 14 are all prepared with 1.0 wt % compatibilizer, which corresponds to a CO/EVOH ratio of 0.00207, above the lower limit of 0.0014. The adhesion ratings for these seven bottles average 4.6. Bottle 15 is a borderline example.

While some of the bottles prepared with 0.5 wt % compatibilizer have good or excellent adhesion, they exhibit greater variation in adhesion than do bottles prepared with 1.0 wt % compatibilizer, which uniformly exhibit very good to excellent adhesion. At 0.5 wt % compatibilizer, adhesion seems to be much more sensitive to changes in materials or processing conditions.

EXAMPLE 4

Film samples are prepared from a random copolymer of propylene and about 1.5 mole % ethylene, melt index 2.1 g/10 min, m.p. 155° C, an ethylene-vinyl alcohol copolymer containing 29 mole % ethylene, and as a compatibilizer, Admer ™ QF 500, a product of Mitsui Petrochemical Company. It is believed that Admer ™ QF 500 is a melt blend of maleic anhydride grafted polypropylene, linear low density polyethylene, and ungrafted polypropylene. The proportions of these components are not known, nor is it known whether any additional ingredients are present. Analysis by titration indicates that Admer ™ QF 500 contains 0.12 ±0.02% by weight anhydride (measured as maleic anhydride), which corresponds to a carbonyl content of about 0.068% by weight.

The film samples contain 10 % EVOH, Admer ™ QF 500 in the amounts indicated in Table 4, and the remainder polypropylene. They are prepared by dry blending component particles in a polyethylene bag, followed by extrusion of 0.5 mm (20 mil) films as in Example 2, at the temperature indicated. The oxygen permeation values, in units of cm3-mm/day-m²-atm are measured and are reported in Table 4.

TABLE 4

| Blend | % Admer ™ | Ratio CO/EVOH | Die temp., °C. | OPV |
|---|---|---|---|---|
| 4-A | 10 | 0.0068 | 195 | 1.74 |
|  |  |  | 210 | 2.82 |
| 4-B | 15 | 0.0102 | 195 | 2.68 |
|  |  |  | 210 | 2.31 |
| 4-C | 20 | 0.0136 | 195 | 2.22 |
|  |  |  | 210 | 5.22 |
| 4-D | 25 | 0.0171 | 195 | 1.78 |
|  |  |  | 210 | 8.68 |

Samples A, B, and C are at or below the lower limit of 0.0014 for the CO/EVOH ratio. Sample D is slightly above this limit, but below the preferred lower limit of 0.002. The adhesion of all eight of these films is poor, based on the ease with which they delaminate when flexed. Samples C and D (extruded at 210°) exhibit slightly improved adhesion. The cause of the poor adhesion of Sample D, which is a borderline example, is not definitely known, but may arise from the presence of one or more unidentified components in the Admer ™ QF 500 which may become important, particularly at unusually high concentrations of the Admer ™. It has been found, for example, that the presence of antiadhesive compounds can lead to erratic results. Deleterious materials should, of course, be avoided. Furthermore, rheological properties of the Admer ™ may lead to deleterious effects when the Admer ™ itself becomes a major component of the blend. Finally, the mixing performance of the small extruder used in this example may be inferior to that of a larger extruder. Thus under different processing conditions, better results might have been attained for Sample D.

What is claimed is:

1. A laminar article consisting essentially of a combination of
   (a) a polyolefin;
   (b) an ethylene-vinyl alcohol copolymer containing about 20-60% by weight of ethylene units, said copolymer having a melting point at least about 5° C. higher than said polyolefin; and,
   (c) a compatibilizer comprising a polyolefin backbone having grafted thereon cyclic anhydride moieties in an amount such that the carbonyl content of the compatibilizer is about 0.3-4.0% by weight, said polyolefin backbone prior to grafting being miscible with said polyolefin (a);

wherein the ethylene-vinyl alcohol copolymer is present within the polyolefin as multiple, thin, substantially parallel, overlapping layers;
the quantity of polyolefin (a) being 0 to about 97.9% by weight, the quantity of ethylene-vinyl alcohol copolymer (b) being about 2-20% by weight, both based on the total weight of (a), (b), and (c), and the quantity of compatibilizer (c) being such that the ratio of the weight of carbonyl groups in the compatibilizer to the weight of ethylene-vinyl alcohol copolymer (b) is about 0.0014:1.0 to about 0.006:1.0.

2. The laminar article of claim 1 wherein the polyolefin is selected from the group consisting of polyethylene, polypropylene, and polybutylene homopolymers and copolymers.

3. The laminar article of claim 2 wherein the polyolefin is selected from the group consisting of of polyethylene and polypropylene.

4. The laminar article of claim 3 wherein the polyolefin is polyethylene.

5. The laminar article of claim 1 wherein the ethylene-vinyl alcohol copolymer is at least about 95% saponified.

6. The laminar article of claim 5 wherein the ethylene-vinyl alcohol copolymer is at least about 99% saponified.

7. The laminar article of claim 1 wherein the ethylene-vinyl alcohol copolymer has a melting point of at least about 10.C greater than that of the polyolefin.

8. The laminar article of claim 1 wherein the compatibilizer is a polyolefin backbone having grafted thereon moieties derived from maleic anhydride.

9. The laminar article of claim 1 wherein the carbonyl content of the compatibilizer is about 0.3-3.0% by weight.

10. The laminar article of claim 1 wherein the carbonyl content of the compatibilizer is about 0.5-2.5% by weight.

11. The laminar article of claim 1 wherein the polyolefin backbone of the compatibilizer is substantially the same as the polyolefin component (a).

12. The laminar article of claim 1 wherein the quantity of compatibilizer is such that the ratio of the weight of carbonyl groups to the weight of ethylene-vinyl alcohol copolymer is about 0.002:1.0 to about 0.004:1.0.

13. The laminar article of claim 1 wherein the quantity of polyolefin (a) is at least about 60%.

14. The laminar article of claim 13 wherein the quantity of polyolefin (a) is at least about 70%.

15. The laminar article of claim 1 wherein the quantity of polyolefin (a) is about 80 to about 90%, the quantity of ethylene-vinyl alcohol copolymer (b) is about 5 to about 15%, and the amount of the compatibilizer is about 0.5 to about 10%.

16. The laminar article of claim 1 wherein the ethylene-vinyl alcohol copolymer is present in the article as thin, substantially parallel, overlapping layers of material.

* * * * *

UNITED STATES PATENT AND TRADEMARK OFFICE
CERTIFICATE OF CORRECTION

PATENT NO. : 4,971,864
DATED : November 20, 1990
INVENTOR(S) : McCord

It is certified that error appears in the above-identified patent and that said Letters Patent is hereby corrected as shown below:

In claim 7, the third line (column 14, line 30) correct the expression "10.C" to read -- 10°C --.

Signed and Sealed this

Seventh Day of April, 1992

Attest:

HARRY F. MANBECK, JR.

Attesting Officer

Commissioner of Patents and Trademarks